United States Patent [19]

Green et al.

[11] 4,177,899
[45] Dec. 11, 1979

[54] DISC MEMORY MODULE WITH STACKABLE DUST SHIELD

[75] Inventors: Paul N. Green; James A. Duff, both of Omaha, Nebr.

[73] Assignee: Magnetic Peripherals Inc., Minneapolis, Minn.

[21] Appl. No.: 939,514

[22] Filed: Sep. 5, 1978

[51] Int. Cl.² .............................................. B65D 55/00
[52] U.S. Cl. ................................... 206/509; 360/133; 220/380; 206/444
[58] Field of Search ............................ 360/97–99, 360/133; 206/444, 503, 509; 211/40; 312/10; 220/23.6, 85 R, 380

[56] References Cited

U.S. PATENT DOCUMENTS

| | | | |
|---|---|---|---|
| 4,014,459 | 3/1977 | Robinson | 220/380 |
| 4,089,414 | 5/1978 | Sandor et al. | 360/133 |

FOREIGN PATENT DOCUMENTS 1459451 12/1976 United Kingdom ..................... 312/10

OTHER PUBLICATIONS

I.B.M./T.D.B., vol. 17, No. 12, May 1975, p. 3745, "Container for Recording Disks," by Cox et al.

Primary Examiner—John H. Wolff
Attorney, Agent, or Firm—E. L. Schwarz

[57] ABSTRACT

An improved disk memory dust shield having an exterior surface similar to the surface of the disk module housing which mates with it, thereby allowing a plurality of dust shields to be nestingly stacked with each other. This permits all the dust shields not currently in use because their disk modules are mounted in drives, to be compactly stored.

1 Claim, 3 Drawing Figures

DISC MEMORY MODULE WITH STACKABLE DUST SHIELD

BACKGROUND OF THE INVENTION

The typical larger scale computer installation employs several and sometimes as many as 50, disk memory drives as peripheral devices. A typical such drive employs detachable disk modules so as to expand the total amount of storage available to a single drive, at the nominal cost of dismounting an old, and mounting a new module when new storage area is needed or when previously recorded information on an unmounted module is needed.

Experience has shown to prevent the read/write heads from scratching the recording surfaces of the disks, that these surfaces and the air within the disk housing of the module must be kept clear of loose particles such as dust. Accordingly, it is a common practice that the module includes a disk housing which has access ports or holes to enable the spindle to rotate the disk, the read/write heads to access the recording surfaces, and freshly filtered air to be continually forced into the housing. When a module is not mounted in a drive, these holes are typically covered by a so-called bottom cover or dust shield which may or may not be detachable.

This invention deals with the detachable type of dust shield used to seal these ports from dust and dirt. In the typical larger computer installation many modules will be mounted in drives simultaneously. Heretofore their temporary storage has always been somewhat of a problem. Special racks to contain them are expensive and inconvenient when one wishes to change the storage location. If they are allowed to lie around loose they are unsightly, occupy a significant amount of tabletop or other horizontal surface, and collect dust which may then be transferred to the disk when attached to the module.

BRIEF DESCRIPTION OF THE INVENTION

To solve these problems, we have designed a dust shield having an external stacking surface essentially duplicating the surface of the disk housing which mates with the dust shield to seal the ports in the housing from dirt. This permits similar dust shields to nestingly mate with each other as well as with the module housing. This permits as many as 20 or 25 covers to be stacked one on top of the other forming a single compact column.

Operators are instructed to store dust shields with the interior opening facing down to avoid settling dust. When this instruction is ignored, as frequently occurs, only the top dust shield is directly exposed to dust and dirt. Since all these dust shields are interchangeable the ones on top will be used first and will have the shortest time of exposure to dust settling in it, and hence total exposure time to dust settling is shortest.

Accordingly, one object of this invention is to provide a means for a compactly storing a large number of such dust shields.

Another object of this invention is to provide at least partial protection aginst dust settling into these dust shields from where it can easily be transferred to the recording disk itself.

DESCRIPTION OF THE PREFERRED EMBODIMENT

Figure 1:
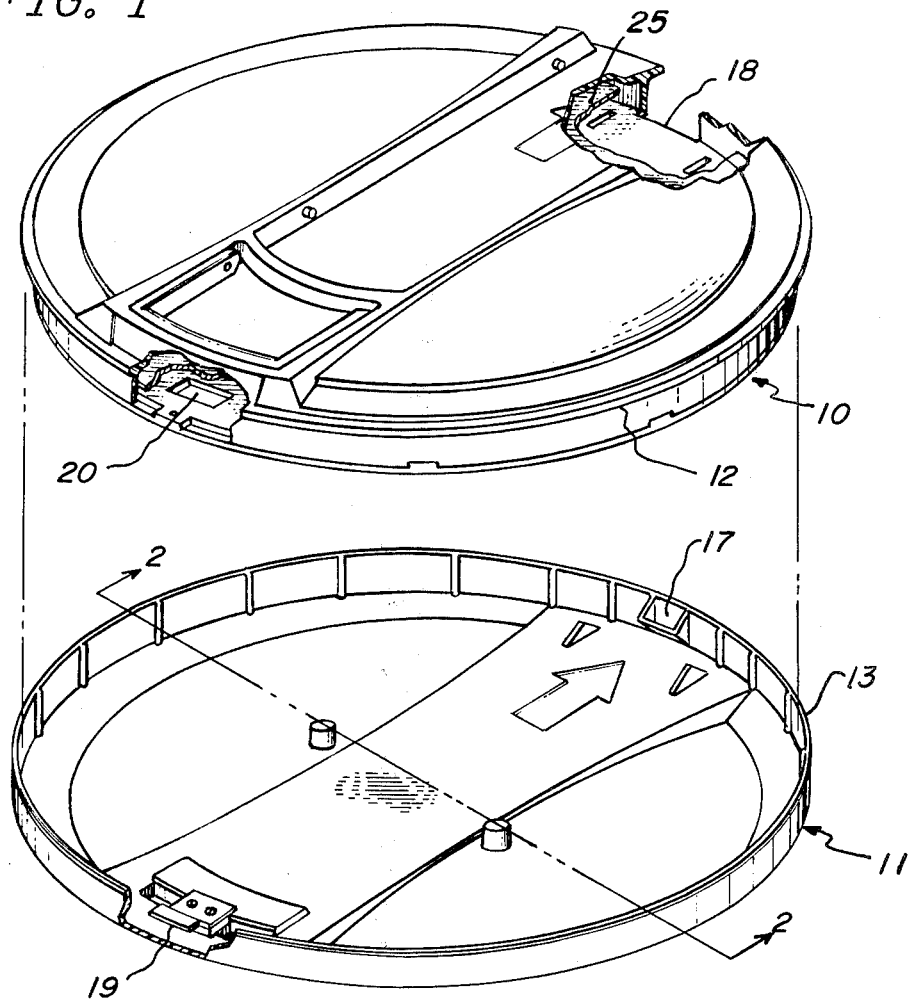
FIG. 1 is a perspective view showing how the dust shield of the invention mates with the housing of the disk module.

Referring first to FIG. 1, dust shield 11 is shown positioned below permanent disk housing 10 in a detached or exploded position. Although not part of the invention, it is helpful in understanding the invention to first briefly discuss the way in which dust shield 11 mates with housing 10. Lip 18 is slipped under projection 17 to lock the outside of shield 11 and housing 10 together. Then latch 19 is slipped radially toward the center of shield 11 allowing it to pass through hole 20 and engage the upper and outer interior surface to housing 10 adjacent hole 20. Annular surface 13 mates with a similarly dimensioned surface 12 to seal the various access apertures or ports (not shown) located along the side and bottom of housing 10, and encircled by surface 12.

Figure 2:
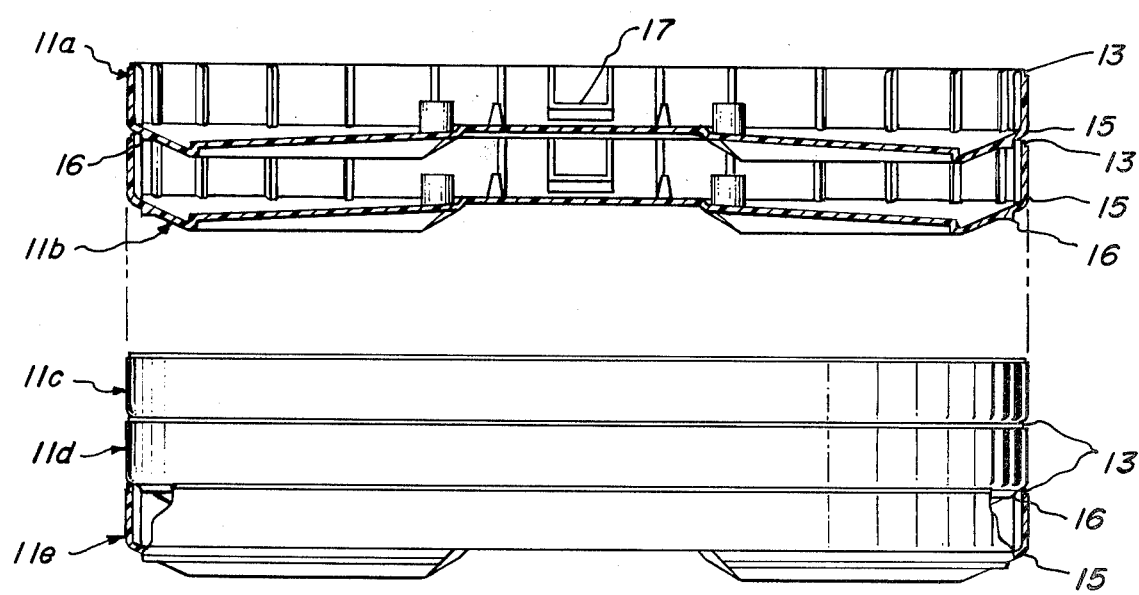
FIG. 2 is a cross section view of a plurality of shields nestingly stacked with each other, with the interior openings facing up.
Figure 3:
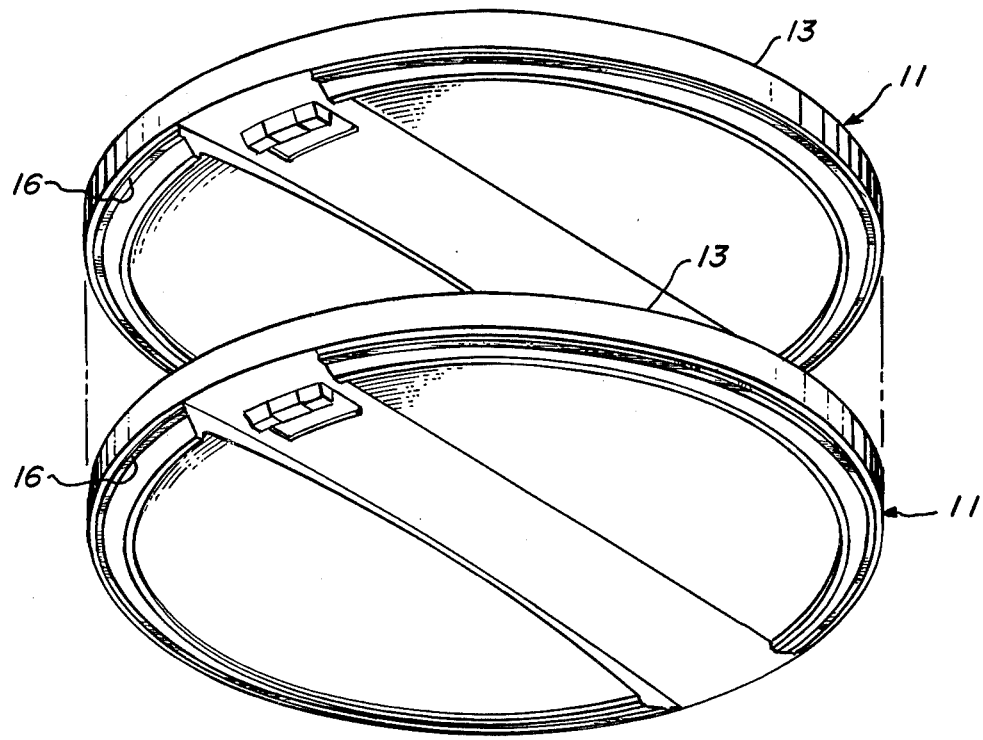
FIG. 3 is a perspective view of two dust shields showing their external stacking surfaces.

FIG. 2 discloses the details of the nesting of several similar dust shields 11a–11e. Annular mating surfaces 13 fit outside of annular ridges 16. Ridges 16 prevent radial sliding of one dust shield 11a-11e with respect to the one below it. Stacking surfaces 15 of shields 11a-11d rest on annular surfaces 13 of the shield below each. It is preferred that both surface 15 and surface 13 be substantially plane circles co-axial with each other as shown. This creates maximum resistance to entry of dust into shields 11, produces vertical stacks of dust shields, and does not impose any angular position requirements to allow proper stacking.

We claim:

1. A dust shield to be detached and attached to a disk memory module of the type having a permanent housing having an aperture permitting access to the disk within by a drive unit, and a dust shield mating surface encircling the aperture, said dust shield having a mating surface mating with the permanent housing mating surface when attached to the module, wherein the improvement comprises a stacking surface on the dust shield similar to the mating surface on the permanent housing and spaced from the mating surface of the dust shield, and including a ridge extending around at least a substantial percentage of the periphery of the dust shield and dimensioned so as to mate with the mating surface of a similar dust shield, whereby a plurality of dust shields may be nestingly stacked with each other by the mating of the ridge with the dust shield mating surface.

* * * * *